United States Patent [19]

Narukawa et al.

[11] 4,148,781
[45] Apr. 10, 1979

[54] FLEXIBLE BUILDING SHEET MATERIALS

[75] Inventors: Hiroshi Narukawa; Yasuhira Takeuchi; Koichi Saito; Yoshio Ohfuji, all of Kurashiki, Japan

[73] Assignee: Kuraray Co., Ltd., Kurashiki, Japan

[21] Appl. No.: 819,547

[22] Filed: Jul. 27, 1977

[30] Foreign Application Priority Data

Aug. 10, 1976 [JP] Japan .................................. 51-95570

[51] Int. Cl.² ............................................. C04B 11/00
[52] U.S. Cl. .................... 260/42.51; 106/109; 156/39; 156/42; 260/42.55; 264/42; 264/125
[58] Field of Search .......... 264/42, 109, 125; 106/111, 109; 156/39, 42, 43; 260/42.51, 42.55

[56] References Cited

U.S. PATENT DOCUMENTS

| 2,913,346 | 11/1959 | Hoffman | 106/111 |
| 3,746,680 | 7/1973 | Boricheski | 106/111 |
| 4,021,259 | 7/1975 | Komatsu | 106/111 |

FOREIGN PATENT DOCUMENTS

| 2251509 | 4/1974 | Fed. Rep. of Germany | 106/111 |
| 1325543 | 8/1973 | United Kingdom | 106/111 |

Primary Examiner—Robert F. White
Assistant Examiner—John A. Parrish
Attorney, Agent, or Firm—Oblon, Fisher, Spivak, McClelland & Maier

[57] ABSTRACT

A flexible building sheet product is prepared by dry molding a slurry comprising predominantly at least one binder component selected from the group consisting of thermoplastic resin emulsions and aqueous solutions of water-soluble polymers, said solutions containing crosslinking agents for said water-soluble polymers, and a matrix component comprising a calcium sulfate dihydrate powder.

10 Claims, No Drawings

FLEXIBLE BUILDING SHEET MATERIALS

BACKGROUND OF THE INVENTION

1. Field of the Invention

The present invention relates to flexible building sheet products. More particularly, the present invention relates to a flexible building sheet product fabricated by a dry molding technique from a mixture of a binder component composed of at least one member selected from the group of thermoplastic resin emulsions and aqueous solutions containing a water-soluble polymer and a cross-linking agent for the polymer and a matrix component composed of calcium sulfate dihydrate powder.

2. Description of the Prior Art

It has been a conventional practice to finish the interiors of buildings with inorganic materials such as mortar and sand-based wall products. However, recently various other interior materials have also come into popular use in order to satisfy the need for a variety of decorations as well as the demand for lower engineering costs. The representative materials thus far available include wallpapers based upon woven fabrics, nonwoven fabrics, converted paper, and the like as well as predecorated plywood products.

In addition, recent demands have required that interior decorating materials should be noncombustible. While gypsum boards, asbestos boards, slates, and the like satisfy the nonflammability requirement, these materials are by no means considered to be decorative interior materials in the usual sense of the word, since they are used only in some ceiling applications.

In addition to the noncombustibility features, desired interior construction materials should satisfy many other requirements which include water resistance, moisture condensation resistance, abrasion resistance, bending workability, impact resistance, bonding qualities, stain resistance, sound absorbing properties, heat insulation, an attractive appearance and shade, and the like. No interior product has yet been developed which satisfactorily meets these requiements. On the other hand, building materials such as gypsum boards which possess improved water resistance and strength can be prepared by the addition of a reforming additive or modifier such as a water-soluble polymer, e.g., polyvinyl alcohol, ureaformaldehyde resin, or the like, and other additives to hydraulic gypsum as disclosed in Japanese Patent Publication No. 14840/69, Japanese Patent Application No. 26524/77, which was laid open to the Public, and Japanese Patent Publication No. 23786/63, for instance.

However, the building sheet product of the present invention is essentially unlike the hard and brittle products of hydraulic inorganic materials, but instead, is primarily based of calcium dihydrate and a water-resistant binder.

SUMMARY OF THE INVENTION

Accordingly, one object of the present invention is to provide a building material in the form of a sheet pliable and flexible enough to be wound up into a roll and which has excellent workability, condensation resistance, ecoratability as well as other properties, i.e., features which permit processing of the material into wall-covering materials, which thus far includes such materials as wallpaper, ceiling board, continuous flooring materials, upholstery materials, coach interior materials, damping materials, heat insulation and the like.

Another object of the present invention is to provide a sheet product which may also be employed in a variety of other building products, such as laminates with aluminum, iron or other sheet metal, asbestos board, slate, gypsum board, calcium silicate board or the like.

Briefly, these objects and other objects of the present invention as hereinafter will become more readily apparent can be attained by a flexible building sheet product which is prepared by dry molding a slurry comprising predominantly at least one binder component selected from the group consisting of thermoplastic resin emulsions and aqueous solutions of water-soluble polymers, said solutions containing cross-linking agents for said water-soluble polymers, and a matrix component comprising a calcium sulfate dihydrate powder.

DESCRIPTION OF THE PREFERRED EMBODIMENTS

The binder component employed in the fabrication of the building sheet product of the present invention is essentially formed as an aqueous solution containing a water-soluble polymer and a cross-linking agent or a thermoplastic resin emulsion, or a mixture of both of these materials. Suitable examples of the water-soluble polymer include polyvinyl alcohol polymers, polyvinyl pyrrolidone, polyvinyl methyl ether, polyvinyl acrylamine, sodium polyacrylate, polyethylene oxide, polyethyleneimine, carboxymethyl-cellulose, hydroxyethyl-cellulose, methyl-cellulose, sodium alginate, caseine, animal glue, dextrin, starch, $\alpha$-starch, hydroxyethyl-starch, gum Arabic, gum tragacanth, and the like. When the water resistance, flexibility, condensation resistance, and other properties of the product sheet are considered, the binder component should preferably be a polyvinyl alcohol-based polymer. For general purposes, the polyvinyl alcohol-based polymer which is employed in the present invention is a polymer obtained by saponifying a vinyl acetate polymer or copolymer or a polymer obtained by graft-polymerization of a monomer onto polyvinyl alcohol. Normally, the degree of polymerization of such a polymer may range from 500 to 3500. While the water-soluble polymer may be any of the water-soluble polymers conventionally employed in textile finishes, paper finishes, pigment binders, emulsifier-dispersants, adhesives, and the like, it must not only be soluble in water, but also, after the addition of an appropriate cross-linking agent, it may be renderedwater insoluble by heating, drying, adjusting the pH or by some other treatment. The cross-linking agent which can be employed in conjunction with the water-soluble polymer may be any agent that is capable of reacting with the functional groups of the water-soluble polymer thereby forming intermolecular cross-links and rendering the polymer insoluble in water. Preferably, the cross-linking agent is soluble or dispersible in water. Thus, while the choice of a particular cross-linking agent depends upon the type of water-soluble polymer used, suitable examples of crosslinking agents include divalent or polyvalent metal compounds such as calcium chloride for sodium alginate, metal salts for methylcellulose and sodium polyacrylate, and polyacrylic acid for polyethylene oxide, to mention but a few possibilities. Suitable examples of cross-linking agents for polyvinyl alcohol-based polymers are compounds capable of undergoing an acetalization reaction including dialdehydes such as glyoxal, terephthalaldehyde, glutaraldehyde, acetalyl disulfide, dialdehyde-starch, polyvinyl alcohol which has terminal aldehyde groups and the like, side-chain aldehyde containing polyvinyl alcohol; polyacrolein; and the like; N-methylol compounds such as N-methylolurea, N-methylolmelamine, N-methylolethyleneurea, N-methylolarcrylamide, and the like; activated vinyl compounds such as divinylsulfone, bishydroxyethylsulfone, disodium tris(p-sulfoethyl) phosphonium, N,N'-methylenebis-acrylamide, and the like; epichlorohydrin and other compounds which are capable of undergoing a ring-opening etherification reaction; dicarboxylic acids; dicarboxylic acid chlorides; acid anhydrides; diesters and compounds which have side-chain groups such as at least two carboxylic acid groups, dicarboxylic acid chloride groups, acid anhydride groups, ester groups or the like, e.g., polyacrylic acid, maleic acid copolymers, and the like; polyvalent isocyanate compounds; and metal compounds of Cu, B, Al, Ti, Zr, Sn, V, Cr, Si, Zn and the like which are capable of forming complex compounds with polyvinyl alcohol-based polymers such as boric acid, borax, titanyl sulfate, titanium potassium oxalate, zirconium oxychloride, and the like.

In terms of the water-resistance, pliability, condensation resistance and other properties of the flexible sheet of the present invention, it is most desirable to employ a polyvinyl alcohol-based polymer as the water-soluble polymer and a metal compound which is capable of forming a complex compound with the polymer as the curing agent. The amount of cross-linking agent employed need only be an amount such that adequate improvements in water resistance may be achieved after an appropriate heat treatment. A plasticizer may also be employed, when necessary in order to attain the desired type of flexible sheet product of the present invention. Suitable examples of plasticizers, include polyhydric alcohols such as ethylene glycol, glycerine, trimethylene glycol, diethylene glycol, tetramethylene glycol, propylene glycol, 1,3-butanediol, pentamethylene glycol, triethylene glycol, hexamethylene glycol, and the like as well as the esters, ethers and Michael adducts of the polyhydric alcohols. The platicizer need be employed only in an amount sufficient to obtain the desired degree of flexibility. If it is used in excessive amounts, it interferes with the blocking resistance, anti-fouling properties, water-resistance, strength and other properties of the product.

The termoplastic resin emulsion which can be employed in the preparation of the product of the present invention can be a material such as vinyl acetate-based polymer emulsions, acrylic polymer emulsions, vinyl chloride-based polymer emulsions, vinylidene chloride-based polymer emulsions, polyurethane-based polymer emulsions or styrene-butadiene copolymer emulsions, although vinyl acetate-based polymer emulsions are particularly desirable. Suitable examples of vinyl acetate-based polymer emulsions include not only the above mentioned vinyl acetate homopolymer emulsions, but also copolymer emulsions of vinyl acetate and various acrylic acid esters (including methacrylates), acrylic acid, methacrylic acid, maleic acid, maleic acid esters, vinyl versatic acid, diacetoneacrylamide, vinyl propionate, vinyl caproate, vinyl chloride and the like.

The thermoplastic resin emulsions which have previously been employed in the preparation of coatings, adhesive compositions, and the like may also be employed in the practice of the present invention, regardless of the method of production involved, the type of emulsifier used, the concentration of nonvolatile matter, the emulsion particle diameter, the emulsion viscosity and other factors. However, if it should happen during the course of manufacture of the flexible sheet product of the present invention, and particularly during the conditioning of the slurry which follows the addition of calcium sulfate dihydrate, that the emulsion is destroyed, some provision, such as pH adjustment, should be made to increase the stability of the emulsion. Moreover, the emulsion employed is preferably one that will yield a product of satisfactory physical properties such as in the weathering qualities, the heat resistance, blocking resistance, dynamic properties, flexural quality and so forth. Particularly, when the sheet product is intended for application to the interiors of buildings, vinyl acetate emulsions are desirable in view of these considerations. The use of a plasticizer for improved flexibility is permissible even when the binder component of the sheet product of the present invention is the thermoplastic resin emulsion but, in such instances, an ester of phthalic acid or of phosphoric acid such as dibutyl phthalate, trioctyl phosphate or the like is normally employed. In addition to the foregoing plasticizers, other plasticizers suitable for any particular thermoplastic resin can also be employed.

Calcium sulfate dihydrate as it is employed in the preparation of the present invention satisfactorily fulfills certain requirements which are essential to building materials such as noncombustibility, shading characteristics, pliability, and the like. For instance, the source of $CaSO_4 \cdot 2H_2O$ may be naturally-occurring gypsum, phosphoric acid by-product gypsum, titanium by-product gypsum, flue gas desulfurization by-product gypsum or any other type of gypsum. Moreover, a portion of the calcium sulfate dihydrate may be replaced with one or more lightweight aggregates such as perlite, hollow beads inclusive of hollow glass beads, and the like. If necessary, it is possible to further incorporate an organic fiber such as vinylon, nylon, or the like; an inorganic fiber such as glass fiber, asbestos, rock wool, or the like; a sheet material such as mica; and webs such as glass paper, glass mat, glass cloth, asbestos paper, cheese cloth, gauze, nonwoven fabric, a woven fabric, paper or the like as well as various dyes, pigments and other colorants, preservatives blowing agents, air entraining agents, cell-size regulators, viscosity builders, (rheology modifiers) and the like into the product.

The method for the production of the building sheet product of the present invention will be described with reference particularly to the case in which a water-soluble polymer-curing agent system is employed as the binder component. In the first place, an aqueous system containing a water soluble polymer in a suitable concentration and a cross-linking agent in an amount commensurate with said polymer, are diluted with an amount of water sufficient for satisfactory molding, if necessary together with a plasticizer, a pigment, a blowing agent, a cell-size regulator and, for the purpose of improving the molding performance of the mix, a viscosity builder such as polyvinyl alcohol. While the mixture is stirred continuously, calcium sulfate dihydrate having a suitable particle size and particle size distribution is gradually added to the mixture to prepare a stock slurry. If necessary, optional reinforcement materials may be added or incorporated in the slurry. If the cross-linking reaction is liable to occur too rapidly, the cross-linking agent should be added in the final stage. It may be necessary to add a further amount of water in order to adjust the moldability of the slurry following the addition of calcium sulfate dihydrate. After defoaming or regulation of the foam-size, the slurry is molded into a sheet. Suitable molding methods employable include extrusion, coating, dipping, and the like. Thus, in the extrusion process, a slurry having a comparatively high viscosity is extruded from the nozzle of an extruding machine as a sheet having a thickness of 0.5 to 5 mm and the extrudate is dried on a rotary drum with a draft of hot air if necessary. This method has the advantage that drying can be easily accomplished. The coating method employed is such that slurry having a comparatively low viscosity is formed into a sheet on a film or belt, for example through a doctor blade having a constant slit width, and the layer so formed is sent to a dryer as it is supported by the film or belt. While the coating method involves drying from one side only and, therefore, is inherently slow, the drying step may be accelerated by coating the slurry directly onto a fabric-type reinforcement member in lieu of the film or belt. The dipping method comprises passing a continuous reinforcing web material through the slurry whereby the slurry is deposited on both sides of the reinforcement. Thereafter, the excess slurry is removed from the reinforcement with a roller or a spatula-shaped blade whereby a suitable thick deposit is obtained, and then the coated assembly is finally dried. This method is characterized by the fact that a web-shaped reinforcement may be embedded in the product sheet and, in addition, offers the advantage of quick drying because of simultaneous drying from both sides. If necessary, in order to obtain a sheet product of an improved resistance to water, the product may be subjected to an insolubilization treatment, which may be accomplished by a variety of methods. For example, a sufficiently dried sheet product may be heat-treated by means of a hot roller, a hot plate, a heat chamber or some other heating device, or alternatively passed through or sprayed with an acidic or alkaline solution to modify the pH of the product. The heat treatment is particularly desirable because crystallization of the water-soluble polymer is assisted. Prior to the insolubilization treatment or thereafter, it is necessary to control and make the thickness of the sheet uniform by passing it over rollers and, in this stage, the product may be embossed in any manner known per se.

Now, an example of a method for the production of a sheet product using a thermoplastic resin emulsion as the binder component will be described. In the first place, a thermoplastic resin emulsion having a suitable concentration of solids is admixed and stirred with a sufficient amount of water to obtain a product of satisfactory molding characteristics together with a plasticizer, a pigment, a blowing agent or air entraining agent and, for improved molding performance, a viscosity builder such as polyvinyl alcohol, if necessary. While the mixture is further stirred, a suitable amount of calcium sulfate dihydrate having a suitable particle size and particle size distribution is gradually added to the mixture to prepare a stock slurry. There may also be cases in which, after the addition of calcium sulfate dihydrate, an additional amount of water is needed to adjust the moldability characteristics of the slurry. After defoaming or regulation of the cell-size, the slurry is molded into a sheet. The molding may be accomplished by any of the extrusion, coating, dipping or the like methods already mentioned. The sheet molded in this manner is sufficiently dried and, then, transferred to a hot roller, hot plate, heating chamber or is heated by some other process, in which it is heat-treated. The temperature and time of the heat treatment must be such that the discrete organic particles in the thermoplastic resin emulsion may fuse together to anchor the inorganic particles in position, and the resultant sheet product will be able to display its potential characteristics. Thus, a heat-treatment at 50° to 200° C. for 3 to 30 minutes will prove appropriate, although the conditions should vary somewhat according to the type of thermoplastic resin binder employed. It is necessary here again to control the thickness of the sheet, e.g., by passing it over a set of cooperating rollers, before or after the heat treatment. It is also possible to emboss the sheet in this stage.

For some applications, the building sheet product of the present invention preferably assumes the form of a foamed sheet having a low specific gravity. To obtain such a formed-type of sheet, basically the same manufacturing methods as that described above may be employed and, by the addition of an air entraining agent or a blowing agent, it is possible to produce a highly foamed sheet having a specific gravity of about 0.1.

In order that foaming may be accomplished by the entrainment of air, stable and fine air cells may be incorporated into the sheet by adding 0.01 to 10 parts by weight of an air entraining agent such as polyvinyl alcohol, potassium oleate or polyethylene glycol monolaurate, to the aforementioned slurry and then thoroughly stirring the mixture. The fine air cells introduced into the sheet by the air entraining treatment remain stable throughout the molding, drying and heat-treating processes. The specific gravity of the foamed sheet can be adjusted by selecting the level of addition of the air entraining agent and the conditions of stirring the slurry. When foaming is to be accomplished by means of a blowing agent, whether by an evaporation-type blowing agent, such a ethanol, toluene or heptane, or a decomposition-type blowing agent such as sodium hydrogen carbonate, ammonium carbonate, azobisisobutyronitrile, p-toluene-sulfonyl hydrazide or the like may be employed. The blowing agent is added to the slurry at a level of about 0.1 to 10 parts by weight. As the slurry goes through the stages of molding, drying and heat treatment similar to those described hereinbefore, the desired foam structure is developed either in the drying stage or during the heat treatment. In order to obtain an effective formation of air cells, it is desirable to select a blowing agent which has an evaporation or decomposition point commensurate with the conditions of the drying and/or heat treatment. The specific gravity of the foamed sheet can be controlled by the selection of the type and amount of blowing agent and the conditions of drying and the heat treatment.

The building sheet product of the present invention is, as has been previously mentioned, pliable and flexible, has satisfactory tensile and flexural strength as well as adequate scratch resistance and adequate abrasion resistance. It is also easily workable and may even be embossed or otherwise processed to produce a product of attractive appearance. The sheet can further be continuously taken up as a roll, and may be laminated to various metal sheets, gypsum board, plywood panels, masonry wall, or the like with the aid of a suitable adhesive or a solvent such as toluene or by heat-fusion with an interposed thermoplastic resin. The sheet product manufactured by lamination of the present sheet may be cut or bent as a unit and, in interior decoration applications, the laminated sheet product exhibits an excellent resistance to moisture condensation because it absorbs and releases moisture in the room. Furthermore, because it contains a high proportion of calcium sulfate dihydrate and an appropriate amount of water, the sheet product of the present invention has excellent fire resistance. Thus, it will not ignite even when a burning cigarette is placed on it. Moreover, because the sheet product of the present invention normally presents a smooth flat surface, it can be easily cleaned if soiled, although ink and other stains would not be easily removed because the sheet is able to absorb water. If required, therefore, the surface of the sheet may be treated with a water-repellent agent to prevent permeation of water. It should be pointed out that, even after such a surface treatment, the sheet is still permeable to water vapor and this means that its condensation-resistance performance is not impaired. It will be apparent that the present building sheet product is a multi-functional material that has all the diverse characteristics required of an interior building material such as for use as ceiling panels, wall boards, flooring materials, and the like and is of value not only as an interior material but also as an upholstery material for furniture and cars. The sheet product of the present invention may also be employed as a vibration-proofing material to be laminated with the walls of an air conditioner or motor housing or as a heat-insulating material.

Having generally described the invention, a more complete understanding can be obtained by reference to certain specific examples, which are included for purposes of illustration only and are not intended to be limiting unless otherwise specified. In the following examples, all parts are in parts by weight unles otherwise indicated.

EXAMPLE 1

To a vinyl acetate-ethylene copolymer emulsion(OM-4000, solids content 50 wt.%, Kuraray Co., Ltd.) was added an amount of diluent water sufficient to make a slurry that would give a water content of 28 weight % after the addition of powdered calcium sulfate dihydrate and the dried powder of by-product calcium sulfate dihydrate from a flue gas desulfurization process, pre-seived through a 32-mesh screen, was added to the above dilution at the levels of addition that would give molded sheet products of the varying solid contents as shown in Table 1. The mixture was stirred to prepare a homogeneous slurry. This slurry was cast on a glass plate surfaced with a polyethylene film and allowed to dry in a room, whereby a sheet product having a thickness of 1.5 mm was obtained. This sheet was heat-treated at one of the temperatures indicated in Table 1 for 15 minutes whereby pliable and flexible building sheet product was prepared. The physical properties specified in Table 1 were then determined. Among the properties mentioned in Table 1, the water holding capacity is the percentage of the water content of each product calculated from its weight as determined after immersion of the product in water for 24 hours relative to the original weight of the sample prior to the immersion treatment and may be regarded as a parameter relevant to water resistance and condensation resistance. The range of 30 to 100% is desirable in interior materials. The noncombustibility test data are the results of a test in which each sheet specimen was laminated to a 0.6 mm thick galvanized iron sheet with an epoxy resin adhesive and the resultant laminate was subjected to a combustibility test procedure similar to that specified in the Japanese Ministry of Construction Notices No. 1828 and No. 3417. The bending workability data are the results of a test in which the sheet product laminated to an iron sheet is bent against a metal platen having an acute angle through an angle of 90 degrees, both inwardly and outwardly, and the cracks produced in the sheet product laminated with the iron sheet were visually examined. The results were rated as "poor" when cracks were produced, while the results were rated "good" when no cracks appeared. This test was performed as an evaluation of the workability performance of the product as an interior material when laminated with a heat-insulting roof in ceiling panels. The water resistance data are the results of a test in which each sheet product specimen bonded to the exterior surfaces of a glass water vessel with a double-faced adhesive tape was placed in a chamber maintained at room temperature (20° C.) and a ralative humidity of 65%. Then, after ice-water at 0° C. was introduced into the vessel, the formation of condensed water droplets was observed on the surface of the sheet specimen during a 5-hour period and the degree of bleeding of the letters written in aqueous ink on the surface of the specimen were visually inspected. The 1.5 mm thick specimens taken from the commercial polyvinyl chloride wallpaper and the mortar-finished wall were found to be "poor" in the condensation resistance test.

As is apparent from Table 1 the sheet products of the present invention after a heat treatment at 120° C. or 150° C. had excellent pliability, bending workability and condensation resistance. These qualities, coupled with the inherent noncombustibility expected of products with high calcium sulfate dihydrate contents, make these products suitable for use as interior sheet materials.

TABLE 1

| Specimen | Example 1-1 | Example 1-2 | Example 1-3 |
| --- | --- | --- | --- |
| Calcium sulfate dihydrate (%) | 85 | 70 | 50 |
| Heat-treatment (° C.) | 150 | 120 | 120 |
| Specific gravity | 1.28 | 1.11 | 1.26 |
| Water holding capacity (%) | 53 | 75 | 60 |
| Tensile strength (kg/cm$^2$) | 14.6 | 25.3 | 38.9 |
| Tensile elongation (%) | 22.3 | 32.7 | 40.2 |
| Combustibility test | Non-combustible | Substantially Non-combustible | Substantially Non-combustible |
| Bending workability | Good | Good | Good |
| Condensation resistance | Good | Good | Good |

EXAMPLE 2

By a procedure similar to that described in Example 1, a 1.5 mm thick thick sheet product containing 85 weight % (based on total solids) of calcium sulfate dihydrate was produced using the by-product calcium sulfate dihydrate powder from a flue gas desulfurization process and, as the thermoplastic resin emulsion, one of the emulsions shown in Table 2. (In the control example, a thermosetting resin emulsion was employed). Each sheet specimen was heat-treated at 150° C. for 15 minutes.

The various properties of the sheet products thus obtained are shown in Table 2. The products manufactured by using a thermoplastic resin emulsion as the binder component were invariably found to be pliable and useful as interior materials. On the other hand, the product manufactured by using a thermosetting resin emulsion as the binder component (Control Example (A)) was found to be hard and brittle, and was processable only with considerable difficulty for interior applications.

was obtained. Various physical properties of the product are shown in Table 3. Without a heat treatment or other finishing treatment, the sheet product displayed excellent water resistance, flexibility, bending workability and condensation resistance. These properties, coupled with the expected noncombustibility, make the product suitable for use as an interior sheet product.

TABLE 2

| Specimen | Example 2-1 | Example 2-2 | Example 2-3 | Example 2-4 | Control Example (A) |
|---|---|---|---|---|---|
| Emulsion Binder | Vinyl acetate homopolymer (prepares with polyvinyl alcohol as emulsifier) | Vinyl acetate-ethylene copolymer (Panflex OM 4100, Kuraray Co., Ltd.) | Butyl acrylate polymer (Acronal ® 380D, Yuka-Badische K.K) | Vinyl chloride polymer (Vinyblan ® 480, Nisshin Kagaku Kogyo, K.K.) | Urea-formaldehyde polymer (Ohshika Resin ® 104, Ohshika Shinko) |
| Specific gravity | 1.12 | 1.03 | 1.25 | 1.32 | 0.85 |
| Water holding capacity (%) | 55 | 65 | 43 | 23 | 140 |
| Tensile strength (kg/cm$^2$) | 30.3 | 13.2 | 23.5 | 32.3 | 3.8 |
| Tensile elongation (%) | 18.2 | 45.5 | 38.7 | 12.3 | 1.3 |
| Bending workability | Good | Good | Good | Good | Poor |

EXAMPLE 3

To a mixture of 53.3 parts of a 15 wt.% aqueous solution of partially saponified polyvinyl alcohol (degree of polymerization 1700, degree of saponification 88 mol%; Kuraray Poval 217; ®, Kuraray Co., Ltd.) and 1.0 part of glycerine was added 88.0 parts of by-product calcium sulfate dihydrate powder obtained from a flue gas desulfurization process and the entire mixture was stirred well to prepare a stock slurry. To this slurry was further added 6.0 parts of a 50 wt.% dioctyl phthalate solution of crude diphenylmethane diisocyanate with a functionality of about 2.5 (Millionate MR ®, Nihon Polyurethane K.K.) and, after stirring, the mixture was quickly cast on a polyethylene terephthalate film. The cast layer was dried at 70° C. for 30 minutes and, then, heat-treated at 120° C. for 10 minutes, whereby an interior sheet product containing 88 weight % of calcium sulfate dihydrate (based on total solids) was obtained. Some physical properties of this specimen are shown in Table 3. This sheet product was highly flexible and had superior bending workability, water resistance and condensation resistance. These properties, coupled with the expected noncombustibility, make the product suitable for use as an interior sheet material.

EXAMPLE 4

To a mixture of 109 parts of a 10 wt.% aqueous solution of completely saponified polyvinyl alcohol (degree of polymerization 1700, Kuraray Poval ®117, Kuraray Co., Ltd.) and 1.1 parts of glycerin was added 88 parts of by-product calcium sulfate dihydrate powder obtained from a flue gas desulfurization process, followed by stirring to obtain a slurry. Separately, a mixture of 1 part of titanium oxide, 2 parts of sulfuric acid and 4.5 parts of water was heated at 350°-400° C. whereby titanyl sulfate (TiOSO$_4$) was obtained. A 0.1 part amount of a 5 wt.% solution of the titanyl sulfate was added to the slurry and, after stirring, the mixture was quickly cast onto a glass plate surfaced with a polyethylene film. The resultant layer was allowed to dry in a room and, then, pressed to a uniform thickness by a means of a cold press whereby a 1.5 mm thick interior sheet product containing 88 wt.% of calcium sulfate dihydrate

EXAMPLE 5

In a manner generally similar to Example 4, 1.0 part of a 35 wt.% solution of zirconium oxychloride (ZrO(OH)Cl) (Zircosol ® ZC-2, Daiichi Kigenso Kagaku K.K.), in lieu of titanyl sulfate, was added to a slurry similar to that of Example 4 and, after stirring, the mixture was quickly cast onto a glass plate surfaced with a polyethylene film. The casting was allowed to dry in a room and, then, heat-treated at 120° C. for 10 minutes whereby a 1.5 mm thick interior sheet product containing 88 weight % of calcium sulfate dihydrate was obtained. Various physical properties of the product are shown in Table 3. This sheet product had excellent water resistance, pliability, bending workability and condensation resistance. These properties, coupled with the expected noncombustibility, make the product suitable for use as an interior sheet product.

CONTROL EXAMPLE (B)

Without the addition of a cross-linking agent, the slurry prepared in Example 4 from polyvinyl alcohol, glycerine, calcium sulfate dihydrate powder and water was cast, dried at room temperature and heat-treatment at 150° C. for 15 minutes whereby a 1.5 mm thick sheet product containing 88 weight % of calcium sulfate dihydrate was obtained. The physical properties of this product are shown in Table 3. While the product was pliable, it was partially dissolved when allowed to stand in water. This poor water resistance makes the product unsuitable for use as an interior material.

TABLE 3

| Specimen | Example 3 | Example 4 | Example 5 | Control Example (B) |
|---|---|---|---|---|
| Cross-linking agent | Iso-cyanate | Titanyl sulfate | Zirconium oxychloride | None |
| Conditions of heat treatment | 120° C., 10 min. | None | 120° C., 10 min. | 150° C., 15 min. |
| Specific gravity | 0.77 | 1.03 | 1.08 | 0.98 |
| Water holding Capacity (%) | 87 | 49.4 | 43.2 | Dissolved and could not be determined |
| Tensile strength (kg/cm$^2$) | 11.1 | 27.5 | 30.8 | 8.3 |
| Tensile elongation (%) | 19.0 | 31.3 | 24.5 | 25.5 |

TABLE 3-continued

| Specimen | Example 3 | Example 4 | Example 5 | Control Example (B) |
|---|---|---|---|---|
| Combustibility test | Noncombustible | Noncombustible | Noncombustible | Noncombustible |
| Bending workability test | Good | Good | Good | Good |
| Condensation resistance | Good | Good | Good | Partially dissolved |

EXAMPLE 6

In a slurry similar to that prepared in Example 5 was incorporated 0.06 part of an air entraining agent (Mighty ®AE-03, Kao-Atlas K.K.) together with 2.5 parts of 2 mm lengths of unsized glass fiber. The resultant reinforced slurry was stirred for a somewhat extended period of time until a sufficient degree of foaming had taken place. Then, the slurry was coated onto a traveling polyethylene film using a 95 cm-wide doctor blade having a slit width of 3.0 mm. The traveling speed of the film was 5.3 m per min. The molding performance was excellent. The coating was dried at room temperature and heat-treated at 120° C. for 10 minutes. Various physical properties of the resultant sheet are shown in Table 4. The thermal conductivity measurements were made on a stack of sheets, not less than 6 cm in overall thickness, by means of a line-heat source. (The thermal conductivity test apparatus was Model TC-22 of Kyoto Denshi Kogyo K.K.)

EXAMPLE 7

In a procedure similar to that described in Example 5, 55 parts of a 20 wt.% aqueous solution of polyvinyl alcohol was used in lieu of 109 parts of a 10 wt.% aqueous solution of the same polyvinyl alcohol and 2.4 parts of sodium bicarbonate where added as a decomposition-type blowing agent to prepare a viscous slurry. This slurry was continuously extruded from a nozzle having a slit width of 2.0 mm on a screw extruder (40 mm φ) and immediately dried on a hot plate at 120° C. Then, the sheet obtained was heat-treated at 150° C. for 20 minutes. By the above procedure was obtained a foamed sheet product having a specific gravity of 0.47 and a thickness of 3.5 mm. As shown in Table 4, the sheet had excellent pliability and heat-insulating properties thus being suitable for use as an intrior material.

EXAMPLE 8

A slurry was prepared by the same procedure as that described in Example 5, except that 0.12 part of an air entraining agent (Kao-Atlas K.K.; Mighty AE-03) and 2.4 parts of sodium hydrogen carbonate where incorporated in the mixture. After a sufficient entrainment of air had been effected by a confectioner's egg beater, the slurry was cast onto a glass mat (Filament Mat MG 60F, Nitto Boseki K.K.), placed on a polyethylene terephthalate film and immediately dried and heat-treated at 120° C. for 40 minutes. Various properties of the resulant sheet product are set forth in Table 4. At a specific gravity of 0.2, the sheet had excellent pliability and heat-insulating properties. Moreover, despite its low gravity, the sheet had high strength. Thus, the sheet product was suitable for use as an interior material (particularly as a ceiling panel, for instance).

EXAMPLE 9

A continuous victoria lawn web of vinylon (Cremona ®cheese cloth 100, Kuraray Co., Ltd.) was passed through a slurry prepared as in Example 5 and the excess slurry was removed by means of a battery of cooperating rubber rollers whereby a uniform layer of deposited material was obtained. The product was dried in a current of hot air and, then heat-treated at 120° C. for 10 minutes, whereby a sheet product including a reinforcing interliner was obtained. It will be seen from Table 4 that, despite its high pliability, the sheet product had excellent strength which makes it suitable for use as an interior material including wall panels, flooring materials, and the like.

TABLE 4

| Specimen | Example 6 | Example 7 | Example 8 | Example 9 |
|---|---|---|---|---|
| Reinforcement | Glass fiber | None | Glass mat | Vinylon victoria lawn |
| Additive | Air-entraining agent | Sodium bicarbonate | Air-entraining agent & sodium bicarbonate | None |
| Molding method | Continuous coating | Extrusion | Casting (sheeting-out) | Dip coating |
| Thickness (mm) | 1.8 | 3.5 | 4.2 | 2.3 |
| Specific gravity | 0.68 | 0.47 | 0.21 | 1.13 |
| Water holding capacity (%) | 63.5 | 80.6 | approx. 150 | 38.5 |
| Tensile strength (kg/cm$^2$) | 33.1 | 10.2 | 23.3 | 49.8 |
| Tensile elongation (%) | 18.7 | 15.1 | 4.1 | 17.3 |
| Bending workability | Good | Good | Good | Good |
| Condensation resistance | Good | Good | Good | Good |
| Thermal conductivity (kcal/m.hr.° C.) | 0.098 | 0.062 | 0.044 | 0.230 |

EXAMPLE 10

To a mixture of 0.175 part of a 10% aqueous solution of polyvinyl alcohol (80% degree of saponification; 2000 degree of polymerization) and 0.030 part of a 10% aqueous solution of polyvinyl alcohol (90% degree of saponification; 1700 degree of polymerization) was added 0.912 part of water and, while being stirred by means of a kneader, 0.72 part of rock wool (Shin Nihon-Seitetsu Kagaku K.K.) and 2.64 parts of a calcium sulfate dihydrate powder by-product of flue gas desulfurization with slaked lime were added and compounded. To this slurry was added 0.888 part of water together with 0.030 part of a special cationic polyamide resin (Sumirez Resin ®650-30, Sumitomo Kagaku K.K.) and 1.158 parts of a vinyl acetate-ethylene-acrylic acid copolymer emulsion (OM 7000, Kuraray Co., Ltd.; solids 49.5 wt.%). After compounding, air was introduced into the mixture with intense stirring which caused the slurry to foam and when a specific gravity of 0.5 had been obtained, the slurry was cast on a carrier sheet and dried at 100° C. for 60 minutes. The resultant sheet product had a thickness of 4 mm, a specific gravity of 0.3 g/cm$^3$, a dimensional change of 0.5% (after 24 hours immersion in water), and a water holding capacity of 200 g/m$^2$. The sheet could be taken up as a roll and was flexible enough to be bent together with an iron sheet laminated to it. A combustibility test showed that the produce was noncombustible.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method of manufacturing a building sheet product which comprises: adding calcium sulfate dihydrate power to a thermoplastic resin emulsion containing a suitable amount of water and other additive if desired, gradually preparing a slurry by mixing and stirring said mixture; defoaming or regulating the cell-size of said slurry; molding said slurry into a sheet; drying the sheet; and subjecting the dried sheet to a heat-treatment such that the thermoplastic resin particles within the sheet are fused together to anchor the calcium sulfate dihydrate powder in position.

2. The method of claim 1, wherein a vinyl acetate-based resin emulsion is employed as said thermoplastic resin emulsion.

3. The method of claim 1, which further comprises: incorporating short lengths of an inorganic fiber into the preparation of said slurry.

4. The method of claim 1, wherein a reinforcement material selected from the group consisting of paper, a nonwoven fabric, a woven fabric, glass mat, glass cloth, asbestos paper, cheese cloth and gauze is employed as a substrate when molding said slurry thereby obtaining a sheet which includes said reinforcement as an integral member.

5. A method of producing a building sheet product which comprises: adding calcium sulfate dihydrate powder to an aqueous solution containing a water-soluble polymer and a cross-linking agent for said polymer, said solution containing at least one other additive if desired; gradually preparing a slurry by mixing and stirring said mixture; defoaming or regulating the cell-size of said slurry; molding the slurry into a sheet, drying said sheet and subjecting the same to a water-insolubilization treatment.

6. The method of claim 5, wherein a polyvinyl alcohol-based polymer is employed as said water-soluble polymer and a metal compound capable of forming a complex compound with said polyvinyl alcohol-based polymer is employed as said cross-linking agent.

7. The method of claim 5, which further comprises: incorporating short lengths of an inorganic fiber into the preparation of said slurry.

8. The method of claim 5, wherein a reinforcement material selected from the group consisting of paper, nonwoven fabric, woven fabric, glass paper, glass mat, glass cloth, asbestos paper, cheese cloth and guaze is employed as a substrate when molding said slurry thereby obtaining a sheet which includes said reinforcement as an integral member.

9. The flexible building sheet product produced by the process of claim 1.

10. The flexible building sheet product produced by the process of claim 5.

* * * * *